J. L. PHILLIPS.
BUCK-BOARD WAGONS.
No. 193,892. Patented Aug. 7, 1877.
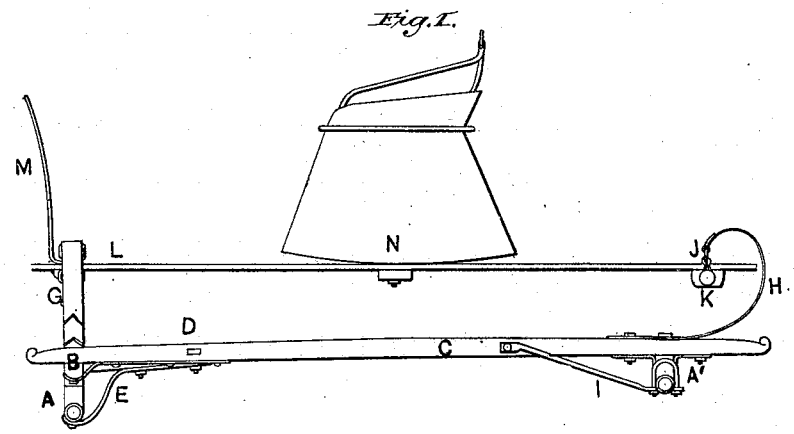
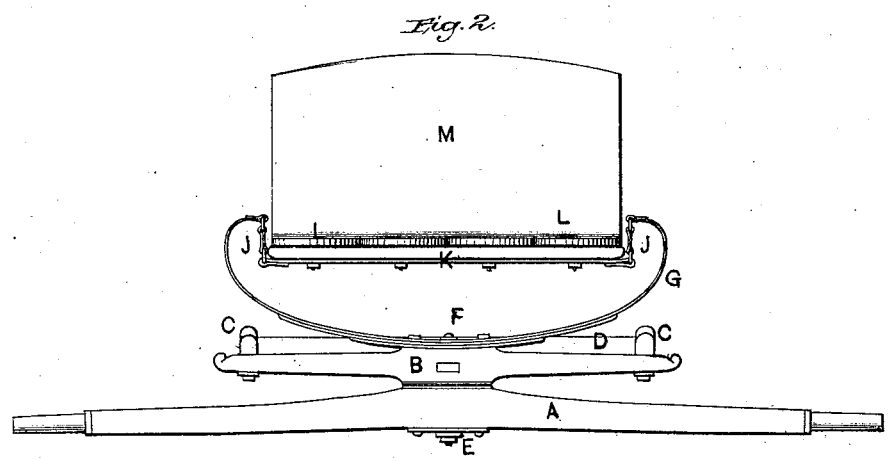

UNITED STATES PATENT OFFICE.

JAMES L. PHILLIPS, OF LOWVILLE, NEW YORK.

IMPROVEMENT IN BUCKBOARD-WAGONS.

Specification forming part of Letters Patent No. 193,892, dated August 7, 1877; application filed May 18, 1877.

*To all whom it may concern:*

Be it known that I, JAMES L. PHILLIPS, of Lowville, in the county of Lewis and State of New York, have invented a new and useful Improvement in the Construction of Buckboard-Wagons, which improvement is fully set forth in the following specification and accompanying drawings, in which—

Figure 1 is a side view, and Fig. 2 is a front view.

Similar letters of reference indicate similar parts in both views.

A and A' are the forward and rear axles of the vehicle. Just above the forward axle A is the cross-head B, which is connected, by side reaches C C, with the rear axle A', the attachment of the two reaches C C with A' being strengthened by the braces I, extending from the outside of C C to clips on the outer end of the axle A', near the wheel-box. A short distance back of the cross-head B the side reaches C C are still further stiffened by the cross-bar D, from the center of which a secondary reach connects it with the center of the cross-head B. Depending from the lower side of this short reach is the metal brace E, which passes beneath the axle A.

Mounted upon a proper seat on the top of the cross-head B is the long C-shaped spring G, and secured to the same by suitable screws or clips. Passing through the center of G is the king-bolt F, which also passes through the center of the cross-head B and axle A, and the lower end of the brace E being secured by a nut beneath.

At the rear half C-springs H are mounted longitudinally upon each of the side reaches, just over the axle A'. From the upper ends of the springs G and H depend, by suitable loops or shackles J, the cross-bars K K, to which, as bed-pieces, are secured the longitudinal strips or boards forming the platform of the vehicle, and to these latter are secured the seat N and the dash-board M.

The rear support of this platform may be, by means of straps, thorough-braces passing over the outside of H, and looped down from their upper extremities around the outer ends of the back cross-bar; or the said bar may be suspended from the ends of the thorough-brace by metal shackles.

What I claim, and desire to secure by Letters Patent, is—

1. In a spring-buckboard wagon, the combination of the spring-buckboard L, hung between the side reaches C C, the forward bar K of which is attached to the bolster or cross-head B by shackles J J and C-spring G, the brace E, cross-reach D, and axle A, as and for the purposes described.

2. In a spring-buckboard wagon, the combination of the spring-buckboard L, the rear cross-bar K, and leather or iron shackles J, and C-springs H, with the side reaches C C, as and for the purpose described.

JAMES L. PHILLIPS.

Witnesses:
GEO. H. MORROW,
J. C. HOUSE.